(12) United States Patent
Malaviya et al.

(10) Patent No.: US 11,714,227 B2
(45) Date of Patent: Aug. 1, 2023

(54) UNIVERSAL OPTICAL FIBER

(71) Applicant: Sterlite Technologies Limited, Aurangabad (IN)

(72) Inventors: Apeksha Malaviya, Aurangabad (IN); Srinivas Reddy Munige, Aurangabad (IN); Anand Kumar Pandey, Aurangabad (IN)

(*) Notice: Subject to any disclaimer, the term of this patent is extended or adjusted under 35 U.S.C. 154(b) by 187 days.

(21) Appl. No.: 16/528,808

(22) Filed: Aug. 1, 2019

(65) Prior Publication Data
US 2021/0033780 A1    Feb. 4, 2021

(30) Foreign Application Priority Data
Jun. 17, 2019   (IN) .............................. 201921023863

(51) Int. Cl.
*G02B 6/02* (2006.01)
*G02B 6/028* (2006.01)
*G02B 6/036* (2006.01)

(52) U.S. Cl.
CPC .......... *G02B 6/028* (2013.01); *G02B 6/0365* (2013.01); *G02B 6/03694* (2013.01)

(58) Field of Classification Search
CPC ... G02B 6/028; G02B 6/0365; G02B 6/03694
USPC .......................................................... 385/124
See application file for complete search history.

(56) References Cited

U.S. PATENT DOCUMENTS

| | | | |
|---|---|---|---|
| 2011/0026891 A1* | 2/2011 | Fini ..................... | G02B 6/036 385/127 |
| 2016/0147012 A1* | 5/2016 | Wang ................... | G02B 6/0288 385/124 |
| 2017/0336558 A1* | 11/2017 | Endo .................. | G02B 6/02009 |
| 2018/0292604 A1* | 10/2018 | Bedard ............... | G02B 6/02333 |

* cited by examiner

*Primary Examiner* — Jerry M Blevins
(74) *Attorney, Agent, or Firm* — Steven R. Fairchild; Michael J. Pennington

(57) ABSTRACT

The present disclosure provides a universal optical fiber (100). The universal optical fiber (100) includes a core (102) extended from a central longitudinal axis (110) to a first radius $r_1$. In addition, the universal optical fiber (100) includes a buffer clad (104) region extending from the first radius $r_1$ to a second radius $r_2$. Further, the universal optical fiber (100) includes a trench region (106) extending from the second radius $r_2$ to a third radius $r_3$. Furthermore, the universal optical fiber (100) includes a cladding (108) extending from the third radius to a fourth radius $r_4$. Moreover, the core (102), the buffer clad region (104), the trench region (106) and the cladding (108) are concentrically arranged.

12 Claims, 2 Drawing Sheets

UNIVERSAL OPTICAL FIBER

FIELD OF INVENTION

The present disclosure relates to the field of optical fiber transmission. More particularly, the present disclosure relates to a bend insensitive universal optical fiber. This application is based on, and claims priority from an Indian Application Number 201921023863 filed on 17 Jun. 2019.

BACKGROUND

With the advancement of science and technology, various modern technologies are being employed for communication purposes. One of the most important modern communication technologies is optical fiber communication technology using a variety of optical fibers. Optical fiber is used to transmit information as light pulses from one end to another. One such type of optical fiber is a single mode optical fiber. The single mode optical fiber is used in FTTx and long haul communication. The telecommunication industry is continuously striving for designs to achieve high data rate capacity and low losses. The ongoing research suggests that the single mode optical fiber of G657 and G652D category are used for FTTx and long-haul applications. The single mode optical fiber of G652D and G657 categories faces major challenges in FTTx and long haul communication respectively. G652D fibers faces major challenges in FTTx application due to good macro bend losses and G657 category fibers face major challenges in long haul applications due to high nonlinear effects as a result of low MFD. Also Low MFD in G657A2 in long haul communication results in a power penalty more than 1.5 decibel as compared to G652D.

In light of the above stated discussion, there is a need for a single mode optical fiber that overcomes the above sited drawbacks to use for FTTx as well as long haul and access networks.

OBJECT OF THE DISCLOSURE

A primary object of the present disclosure is to provide a universal optical fiber with bend insensitivity.

Another object of the present disclosure is to provide the universal optical fiber with good macro-bend performances.

Yet another object of the present disclosure is to provide the universal optical fiber with large mode field diameter.

Yet another object of the present disclosure is to provide the universal optical fiber with large effective area.

SUMMARY

In an aspect of the present disclosure, the present disclosure provides a universal optical fiber. The universal optical fiber includes a core. In addition, the universal optical fiber includes a cladding. Further, the core is defined along a central longitudinal axis of the universal optical fiber. In addition, the core has a first radius $r_1$. Further, the cladding is defined by a third radius $r_3$ and a fourth radius $r_4$ of the universal optical fiber. Furthermore, the universal optical fiber has a mode field diameter. The mode field diameter of the universal optical fiber is in range of about 8.7 micrometer to 9.5 micrometer. Moreover, the universal optical fiber has at least one macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter, macro-bend loss up to 0.03 decibel per 10 turn corresponding to wavelength of 1550 nanometer at bending radius of 15 millimeter and macro-bend loss up to 0.1 decibel per 10 turn corresponding to wavelength of 1625 nanometer at bending radius of 15 millimeter.

In an embodiment of the present disclosure, the universal optical fiber includes a trench region. In addition, the trench region is defined by a second radius $r_2$ and the third radius $r_3$. Further, the trench region has a curve parameter $\alpha_{trench}$ in range of about 1.5 to 2.

In an embodiment of the present disclosure, the core has a curve parameter $\alpha$.

In an embodiment of the present disclosure, the universal optical fiber includes a buffer clad region. In addition, the buffer clad region is defined by the second radius $r_2$ and the first radius $r_1$. Further, a first ratio of $r_2/r_1$ is in range of about 1.5 to 2.

In an embodiment of the present disclosure, the universal optical fiber has at least one of a dispersion of up to 18 picosecond/(nanometer-kilometer) at wavelength of 1550 nanometer. In addition, the universal optical fiber has a zero dispersion wavelength in range of about 1300 nanometer to 1324 nanometer. Further, the universal optical fiber has a cable cut off wavelength of up to 1260 nanometer.

In an embodiment of the present disclosure, the universal optical fiber has the core. The core has a first relative refractive index $\Delta_1$ in range of about 0.35 to 0.40. Further, the core has the first radius $r_1$ in range of about 4.8 micron to 5.5 micron. In addition, the core has a curve parameter $\alpha$ in range of about 2.5 to 7.

In an embodiment of the present disclosure, the universal optical fiber has a buffer clad region. The buffer clad region has a second relative refractive index $\Delta_2$ in range of about 0 to 0.04. Further, the buffer clad region has radius $r_2$ in range of about 7.2 micron to 11 micron.

In an embodiment of the present disclosure, the universal optical fiber has a trench region. In addition, the trench region has a third relative refractive index $\Delta_3$ in range of about −0.25 to −0.30. In addition, the trench region has the third radius $r_3$ in range of about 15 micron to 20 micron.

In an embodiment of the present disclosure, the cladding has a fourth relative refractive index $\Delta_4$. The fourth relative refractive index $\Delta_4$ is zero. Furthermore, the cladding (108) has the fourth radius $r_4$ of about 62.5 micron.

In an embodiment of the present disclosure, the buffer clad region has a second relative refractive index $\Delta_2$ in range of about 0 to 0.04.

In another aspect of the present disclosure, the present disclosure provides a universal optical fiber. The universal optical fiber includes a core. In addition, the universal optical fiber includes a cladding. Further, the core is defined along a central longitudinal axis of the universal optical fiber. In addition, the core has a first radius $r_1$. Further, the cladding is defined by a third radius $r_3$ and a fourth radius $r_4$ of the universal optical fiber. Furthermore, the universal optical fiber includes a trench region. In addition, the trench region is defined by a second radius $r_2$ and the third radius $r_3$. In addition, the trench region concentrically surrounds a buffer clad region. Further, the trench region has a curve parameter $\alpha_{trench}$.

In an embodiment of the present disclosure, the buffer clad region of the universal optical fiber concentrically surrounds the core of the universal optical fiber. In addition, the cladding of the universal optical fiber concentrically surrounds the trench region of the universal optical fiber. Further, the second relative refractive index $\Delta_2$ of the buffer clad region is in range of about 0 to 0.04. Furthermore, the fourth relative refractive index $\Delta_4$ of the cladding is zero.

In an embodiment of the present disclosure, the universal optical fiber has a mode field diameter. The mode field diameter of the universal optical fiber is in range of about 8.7 micrometer to 9.5 micrometer. The universal optical fiber (100) has at least one of macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter, macro-bend loss up to 0.03 decibel per 10 turn corresponding to wavelength of 1550 nanometer at bending radius of 15 millimeter and macro-bend loss up to 0.1 decibel per 10 turn corresponding to wavelength of 1625 nanometer at bending radius of 15 millimeter.

In an embodiment of the present disclosure, the universal optical fiber has the core. The core has a first relative refractive index $\Delta_1$. In addition, the first relative refractive index $\Delta_1$ is in range of about 0.35 to 0.40. Further, the core has the first radius $r_1$. The first radius $r_1$ is in range of about 4.8 micron to 5.5 micron. In addition, the core has a curve parameter $\alpha$ in range of about 2.5 to 7. Further, the universal optical fiber has the buffer clad region. The buffer clad region has a second relative refractive index $\Delta_2$. In addition, the second relative refractive index $\Delta_2$ of buffer clad region is in range of about 0 to 0.04. Further, the buffer clad region has radius $r_2$. Furthermore, the second radius $r_2$ is in range of about 7.2 micron to 11 micron. Furthermore, the universal optical fiber has the trench region. In addition, the trench region has a third relative refractive index $\Delta_3$. The third relative refractive index $\Delta_3$ is in range of about −0.25 to −0.30. In addition, the trench region has the third radius $r_3$. Further, the third radius $r_3$ is in range of about 15 micron to 20 micron. Moreover, the universal optical fiber has the cladding. In addition, the cladding has a fourth relative refractive index $\Delta_4$. Further, the fourth relative refractive index is zero. Furthermore, the cladding has the fourth radius $r_4$. Moreover, the fourth radius $r_4$ is about 62.5 micron.

In an embodiment of the present disclosure, the universal optical fiber has a first ratio. In addition, the first ratio is a ratio of second radius $r_2$ of the buffer clad region and the first radius $r_1$ of the core of the universal optical fiber. Further, the first radius is in range of about 1.5 to 2.

In an aspect of the present disclosure, the present disclosure provides a universal optical fiber. The universal optical fiber includes a core. In addition, the universal optical fiber includes a cladding. Further, the core is defined along a central longitudinal axis of the universal optical fiber. In addition, the core has a first radius $r_1$. Further, the cladding is defined by a third radius $r_3$ and a fourth radius $r_4$ of the universal optical fiber. Furthermore, the universal optical fiber has a mode field diameter. The mode field diameter of the universal optical fiber is in range of about 8.7 micrometer to 9.5 micrometer. Moreover, the universal optical fiber has at least one macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter, macro-bend loss up to 0.03 decibel per 10 turn corresponding to wavelength of 1550 nanometer at bending radius of 15 millimeter and macro-bend loss up to 0.1 decibel per 10 turn corresponding to wavelength of 1625 nanometer at bending radius of 15 millimeter.

BRIEF DESCRIPTION OF FIGURES

Figure 1:
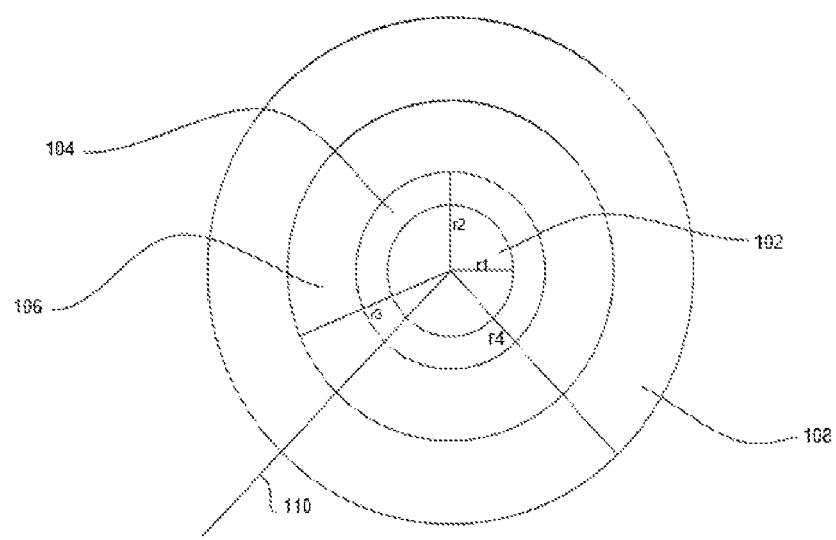
Figure 2:
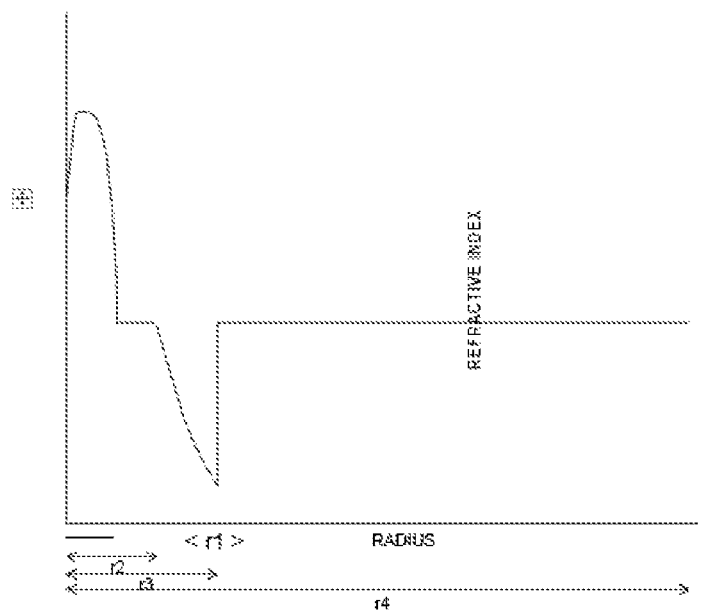

Having thus described the disclosure in general terms, reference will now be made to the accompanying figures, wherein:

FIG. 1 illustrates a cross-sectional view of a universal optical fiber, in accordance with various embodiments of the present disclosure; and FIG. 2 illustrates a refractive index profile of the universal optical fiber, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of a universal optical fiber 100, in accordance with various embodiments of the present disclosure. In general, optical fiber is a thin strand of glass or plastic capable of transmitting optical signals. In an embodiment of the present disclosure, the universal optical fiber 100 is configured to transmit information over long distances with low non-linear effects as compared to G657A2 and good macro-bend performance.

The universal optical fiber 100 includes a core 102, a cladding 108, a buffer clad region 104 and a trench region 106. In general, core is an inner part of an optical fiber and cladding is an outer part of the optical fiber. In an embodiment of the present disclosure, the core 102 is defined along a central longitudinal axis 110 of the universal optical fiber 100. The central longitudinal axis 110 is an imaginary axis.

Further, the core 102, the cladding 108, the buffer clad region 104 and the trench region 106 of the universal optical fiber 100 are associated with a refractive index profile. In general, the refractive index profile is maintained as per required level based on concentration of chemicals used for manufacturing of an optical fiber. In addition, the chemicals used for manufacturing of the optical fiber include one or more materials and one or more dopants. Further, the one or more materials and the one or more dopants are deposited over surface of initial material with facilitation of flame hydrolysis. Furthermore, the initial material is a substrate rod or a tube.

In an embodiment of the present disclosure, the refractive index profile determines relationship between a refractive index of the universal optical fiber 100 and a radius of the universal optical fiber 100. In addition, the radius of the universal optical fiber 100 corresponds to a first radius $r_1$, a second radius $r_2$, a third radius $r_3$ and a fourth radius $r_4$. In an embodiment of the present disclosure, manufacturing of the universal optical fiber 100 is carried out after manufacturing of a preform. Further, the refractive index profile of the universal optical fiber 100 is determined during manufacturing of the preform of the universal optical fiber 100.

In an embodiment of the present disclosure, the core 102 of the universal optical fiber 100 has a first relative refractive index $\Delta_1$. In addition, the core 102 has maximum refractive index $n_{max}$. Further, the core 102 has a curve parameter α (alpha). Furthermore, the core 102 of the universal optical fiber 100 has the first radius $r_1$. In an embodiment of the present disclosure, the first radius $r_1$ is in range of about 4.8 micron to 5.5 micron. In another embodiment of the present disclosure, range of the first radius $r_1$ of the core 102 may vary. In an example, the core 102 has a first radius of about 4.92 micron. In another example, the core has the first radius of about 4.95 micron. In yet another example, the first radius has a value of about 5.3 micron. In an embodiment of the present disclosure, the core 102 has the first relative refractive index $\Delta_1$ in range of about 0.35 to 0.40. In another embodiment of the present disclosure, range of the first relative refractive index $\Delta_1$ may vary. In an example, the first relative refractive index $\Delta_1$ has a value of 0.36. In another example, the first relative refractive index $\Delta_1$ has a value of 0.38. In an embodiment of the present disclosure, the curve parameter alpha α is in range of about 3 to 6. In another embodiment of the present disclosure, range of the curve parameter alpha α may vary. In an example, the value of alpha α is 3. In another example the value of alpha α is 5. In yet another example, the value of alpha α is 6.

The expression used for calculating the relative refractive index is produced below:

$$\Delta i = 100 \times \left( \frac{n_i^2 - n_{clad}^2}{2 \times n_i^2} \right)$$

wherein, $n_{clad}$: refractive index of the pure silica;
$n_i$: refractive index of the $i_{th}$ layer;
$\Delta i$: the relative refractive index of $i_{th}$ layer.

In an embodiment of the present disclosure, the refractive index profile changes between the second radius $r_2$ and the fourth radius $r_4$ of the universal optical fiber 100. Further, the relative refractive index of the core 102, the cladding 108, the buffer clad region 104 and the trench region 106 has a pre-defined value. Furthermore, the radius of the core 102, the cladding 108, the buffer clad region 104 and the trench region 106 has a pre-defined value. In an embodiment of the present disclosure, the pre-defined values of the relative refractive index is set to obtain good macro-bend performance and reduce non-linear effects as compared to G657A2.

In an embodiment of the present disclosure, the buffer clad region 104 is defined by the first radius $r_1$ and the second radius $r_2$ from the central longitudinal axis 110 of the universal optical fiber 100. The buffer clad region 104 has a second relative refractive index $\Delta_2$. Further, the trench region 106 is defined by the second radius $r_2$ and the third radius $r_3$ from the central longitudinal axis 110 of the universal optical fiber 100. The trench region 106 has a third relative refractive index $\Delta_3$. Furthermore, the cladding 108 is defined by the third radius $r_3$ and the fourth radius $r_4$. Moreover, the cladding 108 has a fourth relative refractive index of $\Delta_4$.

In an embodiment of the present disclosure, the buffer clad region 104 of the universal optical fiber 100 has the second radius $r_2$ in range of about 7.2 micron to 11 micron. In another embodiment of the present disclosure, range of the second radius $r_2$ may vary. In an example, the second radius $r_2$ has a value of 8.364 micron. In another example, the second radius $r_2$ has a value of 8.91 micron. In yet another example, the second radius $r_2$ has a value of 9.01 micron. In an embodiment of the present disclosure, the buffer clad region 104 of the universal optical fiber 100 has the second relative refractive index $\Delta_2$ is in range of about 0 to 0.04. In another embodiment of the present disclosure, the second relative refractive index $\Delta_2$ of the buffer clad region 104 of the universal optical fiber 100 may vary. In an example, the second relative refractive index $\Delta_2$ has a value of 0. In another example, the second relative refractive index $\Delta_2$ has a value of 0.02. In yet another example, the second relative refractive index $\Delta_2$ has a value of 0.04.

In an embodiment of the present disclosure, the trench region 106 of the universal optical fiber 100 has the third radius $r_3$ in range of about 15 micron to 20 micron. In another embodiment of the present disclosure, range of the third radius $r_3$ may vary. In an example, the third radius $r_3$ has a value of 15.5. In another example, the third radius $r_3$ has a value 17. In yet another example, the third radius $r_3$ has value of about 19. In an embodiment of the present disclosure, the trench region 106 of the universal optical fiber 100 has the third relative refractive index $\Delta_3$ is in range of about −0.25 to −0.30. In another embodiment of the present disclosure, range of the third relative refractive index $\Delta_3$ may vary. In an example, the third relative refractive index $\Delta_3$ has a value of about −0.29. In another example, the third relative refractive index $\Delta_3$ has a value of about −0.26. In yet another example, the third relative refractive index $\Delta_3$ has a value of about −0.28. In an embodiment of the present disclosure, the trench region 106 includes a curve parameter $\alpha_{trench}$ about 1.5. In another embodiment of the present disclosure, value of the curve parameter $\alpha_{trench}$ may vary. In an example, the curve parameter $\alpha_{trench}$ has a value of 1.9. In another example, the curve parameter $\alpha_{trench}$ has a value of about 1.6. In yet another example, the curve parameter $\alpha_{trench}$ has a value of about 1.7.

In an embodiment of the present disclosure, the cladding 108 of the universal optical fiber 100 has the fourth radius $r_4$ of about 62.5 micron. In another embodiment of the present disclosure, value of the fourth radius $r_4$ may vary. In an embodiment of the present disclosure, the cladding 108 has the fourth relative refractive index $\Delta_4$ of zero. In another embodiment of the present disclosure, the fourth relative refractive index $\Delta_4$ of the cladding 108 of the universal optical fiber 100 may vary.

In an embodiment of the present disclosure, the core 102 of the universal optical fiber 100 has maximum refractive index $n_{max}$. In addition, the buffer clad region 104 has refractive index of pure silica $n_{clad}$. Further, minimum refractive index of the trench region 106 is $n_{trench}$. Furthermore, expressions used to determine refractive index is given by below:

$$n(r) = n_{max}\left[1 - 2\Delta 1\left(\frac{r}{R1}\right)^{\alpha}\right]^{0.5}$$

$$\text{for } r \leq r_1$$

$$n(r) = n_{clad}$$

$$\text{for } r_1 \leq r \leq r_2 \text{ and } r \geq r_3$$

$$n(r) = n_{clad} - n_{trench}[1 + 2\Delta 3((R3 - r)/(R3 - R2))^{\alpha_{trench}}]^{0.5}$$

$$\text{for } r_2 \leq r \leq r_3$$

In an embodiment of the present disclosure, the refractive index profile of the universal optical fiber 100 low non-linear effects as compared to G657A2 and good macro-bend performance. Further, the universal optical fiber 100 has large mode field diameter and large effective area.

In an embodiment of the present disclosure, the universal optical fiber 100 has the mode field diameter in range of about 8.7 micron to 9.5 micron at wavelength of 1310 nanometer. In another embodiment of the present disclosure, range of the mode field diameter of the universal optical fiber 100 may vary. In general, mode field diameter defines a section or area of optical fiber in which the optical signals travel. In an embodiment of the present disclosure, the cladding 108 of the universal optical fiber 100 has a diameter in range of about 124.3 micron to 125.7 micron. In another embodiment of the present disclosure, the diameter of the cladding 108 of the universal optical fiber 100 may vary.

In an embodiment of the present disclosure, the universal optical fiber 100 has a cable cut off wavelength of up to 1260 nanometer. In another embodiment of the present disclosure, the cable cut off wavelength of the universal optical fiber 100 may vary. In an embodiment of the present disclosure, the universal optical fiber 100 has a zero dispersion wavelength in range of about 1300 nanometer to 1324 nanometer. In another embodiment of the present disclosure, range of the zero dispersion wavelength of the universal optical fiber 100 may vary.

In an embodiment of the present disclosure, the universal optical fiber 100 has a dispersion of up to 18 picosecond/ (nanometer-kilometer). In another embodiment of the present disclosure, the dispersion of the universal optical fiber 100 may vary.

The universal optical fiber 100 has macro-bend loss in complaint to the ITUT G657.A2. In general, bending loss is a loss that occurs when optical fiber is bent. In addition, bending loss includes macro-bend loss and a micro-bend loss. Moreover, the universal optical fiber 100 has at least one macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter, macro-bend loss up to 0.03 decibel per 10 turn corresponding to wavelength of 1550 nanometer at bending radius of 15 millimeter and macro-bend loss up to 0.1 decibel per 10 turn corresponding to wavelength of 1625 nanometer at bending radius of 15 millimeter.

In general, bending radius is a minimum radius of the inner curvature formed on bending optical fiber.

FIG. 2 illustrates the refractive index profile 200 of the universal optical fiber 100, in accordance with various embodiments of the present disclosure. The refractive index profile 200 illustrates relationship between the refractive index of the universal optical fiber 100 and the radius of the universal optical fiber 100 (as shown in FIG. 1). In an embodiment of the present disclosure, the refractive index profile 200 shows change in the relative refractive index of the core 102, the buffer clad region 104, the trench region 106 and the cladding 108 with the radius of the universal optical fiber 100.

In an embodiment of the present disclosure, the universal optical fiber 100 has a first ratio. In addition the first ratio is ratio of the second radius $r_2$ of the buffer clad region 104 to the first radius $r_1$ of the core 102 of the universal optical fiber 100. In an embodiment of the present disclosure, the first ratio of the universal optical fiber 100 is in range of about 1.5 to 2. In another embodiment of the present disclosure, range of the first ratio of the universal optical fiber 100 may vary. In an example, the first ratio of the universal optical fiber 100 has a value of about 1.7. In another example, the first ratio of the universal optical fiber 100 has a value of about 1.8.

In addition, the universal optical fiber 100 has the mode field diameter. In an example, the mode field diameter is about 9.08 micron at wavelength of 1310 nanometer. In another example, the mode field diameter is about 9.12 micron at wavelength of 1310 nanometer. Further, the universal optical fiber 100 has the zero dispersion wavelength. In an example, the zero dispersion wavelength is about 1308 nanometer. In another example, the zero dispersion wavelength is about 1300 nanometer. In yet another example, the zero dispersion wavelength is about 1313 nanometer. In yet another example, the zero dispersion wavelength is about 1317 nanometer. Furthermore, the universal optical fiber 100 has the dispersion. In an example, the dispersion is about 15 picosecond/(nanometer-kilometer) at wavelength of 1550 nanometer. In another example, the dispersion is about 17.3 picosecond/(nanometer-kilometer) at wavelength of 1550 nanometer. In yet another example, the dispersion is about 15 picosecond/(nanometer-kilometer) at wavelength of 1550 nanometer. In yet another example, the dispersion is about 17 picosecond/(nanometer-kilometer) at wavelength of 1550 nanometer.

Moreover, the universal optical fiber 100 has the cable cut off wavelength. In an example, the cable cutoff wavelength is about 1206 nanometer. In another example, the cable cutoff wavelength is about 1230 nanometer. In yet another example, the cable cutoff wavelength is about 1240 nanometer. In yet another example, the cable cutoff wavelength is about 1210 nanometer. Also, the universal optical fiber 100 is associated with macro-bend loss. In an example, macro-bend loss of the universal optical fiber 100 is about 0.047 decibel per turn corresponding to wavelength of 1550 nanometer at bending radius of 7.5 millimeter. In another example, macro-bend loss of the universal optical fiber 100 is about 0.121 decibel per turn corresponding to wavelength of 1550 nanometer at bending radius of 7.5 millimeter. In yet another example, macro-bend loss of the universal optical fiber 100 is about 0.168 decibel per turn corresponding to wavelength of 1550 nanometer at bending radius of 7.5 millimeter. In yet another example, macro-bend loss of the universal optical fiber 100 is about 0.25 decibel per turn corresponding to wavelength of 1550 nanometer at bending radius of 7.5 millimeter.

In an example, macro-bend loss of the universal optical fiber 100 is about 0.107 decibel per turn corresponding to wavelength of 1625 nanometer at bending radius of 7.5 millimeter. In another example, macro-bend loss of the universal optical fiber 100 is about 0.26 decibel per turn corresponding to wavelength of 1625 nanometer at bending radius of 7.5 millimeter. In yet another example, macro-bend loss of the universal optical fiber 100 is about 0.53 decibel per turn corresponding to wavelength of 1625 nanometer at bending radius of 7.5 millimeter. In yet another example, macro-bend loss of the universal optical fiber 100 is about 0.363 decibel per turn corresponding to wavelength of 1625 nanometer at bending radius of 7.5 millimeter.

In an example, macro-bend loss of the universal optical fiber 100 is about 0.013 decibel per turn corresponding to wavelength of 1550 nanometer at bending radius of 10 millimeter. In another example, macro-bend loss of the universal optical fiber 100 is about 0.031 decibel per turn corresponding to wavelength of 1550 nanometer at bending radius of 10 millimeter. In yet another example, macro-bend loss of the universal optical fiber 100 is about 0.047 decibel per turn corresponding to wavelength of 1550 nanometer at bending radius of 10 millimeter. In yet another example, macro-bend loss of the universal optical fiber 100 is about 0.035 decibel per turn corresponding to wavelength of 1550 nanometer at bending radius of 10 millimeter.

In an example, macro-bend loss of the universal optical fiber 100 is about 0.035 decibel per turn corresponding to wavelength of 1625 nanometer at bending radius of 10 millimeter. In another example, macro-bend loss of the universal optical fiber 100 is about 0.086 decibel per turn corresponding to wavelength of 1625 nanometer at bending radius of 10 millimeter. In yet another example, macro-bend loss of the universal optical fiber 100 is about 0.139 decibel per turn corresponding to wavelength of 1625 nanometer at bending radius of 10 millimeter. In yet another example, macro-bend loss of the universal optical fiber 100 is about 0.103 decibel per turn corresponding to wavelength of 1625 nanometer at bending radius of 10 millimeter.

In an example, macro-bend loss of the universal optical fiber 100 is about 0.007 decibel per 10 turn corresponding to wavelength of 1550 nanometer at bending radius of 15 millimeter. In another example, macro-bend loss of the universal optical fiber 100 is about 0.015 decibel per 10 turn corresponding to wavelength of 1550 nanometer at bending radius of 15 millimeter. In yet another example, macro-bend loss of the universal optical fiber 100 is about 0.016 decibel per 10 turn corresponding to wavelength of 1550 nanometer at bending radius of 15 millimeter. In yet another example, macro-bend loss of the universal optical fiber 100 is about 0.013 decibel per 10 turn corresponding to wavelength of 1550 nanometer at bending radius of 15 millimeter.

In an example, macro-bend loss of the universal optical fiber 100 is about 0.034 decibel per 10 turn corresponding to wavelength of 1625 nanometer at bending radius of 15 millimeter. In another example, macro-bend loss of the universal optical fiber 100 is about 0.069 decibel per 10 turn corresponding to wavelength of 1625 nanometer at bending radius of 15 millimeter. In yet another example, macro-bend loss of the universal optical fiber 100 is about 0.076 decibel per 10 turn corresponding to wavelength of 1625 nanometer at bending radius of 15 millimeter. In yet another example, macro-bend loss of the universal optical fiber 100 is about 0.062 decibel per 10 turn corresponding to wavelength of 1625 nanometer at bending radius of 15 millimeter.

The present disclosure provides numerous advantages over the prior art. The present disclosure provides the universal optical fiber with bend insensitiveness. In addition, the present disclosure provides an optical fiber of G652D category with the bend performance in compliance with G657 category fibers. Further, the present disclosure provides the optical fiber that can be used in FTTX and long haul and access networks. Further, the universal optical fiber has large mode field diameter and effective area. Further, the universal optical fiber has improved macro-bend performance. Furthermore, the universal optical fiber has low non-linear effects as compared to the ITUT G657A2 category.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A universal optical fiber (100) comprising:
   a core (102) defined along a central longitudinal axis (110) of the universal optical fiber (100), wherein the core (102) has a first radius $r_1$ and a first refractive index $\Delta_1$ in a range of 0.35 to 0.40;
   a buffer clad region (104) concentrically surrounding the core (102), wherein the buffer clad region is defined between the first radius $r_1$ and a second radius $r_2$ and has a refractive index $\Delta_2$ less than the refractive $\Delta_1$;
   a trench region (106), wherein the trench region (106) is defined by the second radius $r_2$ and a third radius $r_3$ and a refractive index $\Delta_3$ and wherein the refractive index $\Delta_3$ is less than a refractive index $\Delta_4$ and is a negative refractive index, wherein the trench region (106) includes a curve parameter a trench in a range of 1.5-1.9; and
   a cladding (108), wherein the cladding (108) is defined by the third radius $r_3$ and a fourth radius $r_4$ of the universal optical fiber (100) and the refractive index $\Delta_4$ less than the refractive indices $\Delta_1$ and $\Delta_2$,
   wherein the universal optical fiber (100) has a mode field diameter in a range of 8.7 micrometer to 9.5 micrometer,
   wherein the universal optical fiber (100) has at least one of macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter and macro-bend loss up to 0.03 decibel per 10 turn corresponding to wavelength of 1550 nanometer at bending radius of 15 millimeter, and macro-bend loss is up to 0.1 decibel per 10 turn corresponding to wavelength of 1625 nanometer at bending radius of 15 millimeter.

2. The universal optical fiber (100) as claimed in claim 1, a first ratio of $r_2/r_1$ is in a range of 1.5 to 2.

3. The universal optical fiber (100) as claimed in claim 1, wherein the universal optical fiber (100) has at least one of a dispersion of up to 18 picosecond/(nanometer-kilometer) at wavelength of 1550 nanometer, a zero dispersion wavelength in a range of 1300 nanometer to 1324 nanometer and a cable cut off wavelength of up to 1260 nanometer.

4. The universal optical fiber (100) as claimed in claim 1, wherein the core (102) has the first radius $r_1$ in a range of 4.8 micron to 5.5 micron.

5. The universal optical fiber (100) as claimed in claim 1, further comprising a buffer clad region (104), wherein the buffer clad region (104) has at least one of:
  a. a second relative refractive index $\Delta_2$ in a range of 0 to 0.04; and
  b. a second radius $r_2$ in a range of 7.2 micron to 11 micron.

6. The universal optical fiber (100) as claimed in claim 1, further comprising a trench region (106), wherein the trench region (106) has at least one of:
  a. a third relative refractive index $\Delta_3$ in a range of −0.25 to −0.30; and
  b. the third radius $r_3$ in a range of 15 micron to 20 micron.

7. The universal optical fiber (100) as claimed in claim 1, wherein the cladding (108) has at least one of:
  a. a fourth relative refractive index $\Delta_4$, wherein the fourth relative refractive index $\Delta 4$ is zero; and
  b. the fourth radius $r_4$, wherein the fourth radius $r_4$ is 62.5 micron.

8. The universal optical fiber (100) as claimed in claim 1, further comprising a buffer clad region (104), wherein the buffer clad region (104) has a second relative refractive index $\Delta_2$, wherein the second relative refractive index $\Delta_2$ is in a range of 0 to 0.04.

9. A universal optical fiber (100) comprising:
  a core (102), wherein the core (102) is defined along a central longitudinal axis (110) of the universal optical fiber (100), wherein the core (102) has a first radius $r_1$ and a refractive index $\Delta_1$ in a range of 0.35 to 0.40;
  a cladding (108), wherein the cladding (108) is defined by a third radius $r_3$ and a fourth radius $r_4$ of the universal optical fiber (100) and has a refractive index $\Delta_4$ lesser than the refractive index $\Delta_1$; and
  a trench region (106), wherein the trench region (106) is defined by a second radius $r_2$ and the third radius $r_3$, wherein the trench region (106) concentrically surrounds a buffer clad region (104), and a refractive index $\Delta_3$, and wherein the refractive index $\Delta_3$ is less than the refractive index $\Delta_4$, wherein the trench region (106) includes a curve parameter $\alpha_{trench}$ in a range of 1.5-1.9.

10. The universal optical fiber (100) as claimed in claim 9, wherein the buffer clad region (104) of the universal optical fiber (100) concentrically surrounds the core (102) of the universal optical fiber (100), wherein the cladding (108) of the universal optical fiber (100) concentrically surrounds the trench region (106) of the universal optical fiber (100), wherein the second relative refractive index $\Delta_2$ of the buffer clad region (104) is in a range of 0 to 0.04, wherein the fourth relative refractive index $\Delta_4$ of the cladding (108) is zero.

11. The universal optical fiber (100) as claimed in claim 9, wherein the universal optical fiber (100) has a mode field diameter in a range of 8.7 micrometer to 9.5 micrometer, wherein the universal optical fiber (100) has at least one of macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter, macro-bend loss of up to 0.03 decibel per 10 turn corresponding to wavelength of 1550 nanometer at bending radius of 15 millimeter, and macro-bend loss up to 0.1 decibel per 10 turn corresponding to wavelength of 1625 nanometer at bending radius of 15 millimeter.

12. The universal optical fiber (100) as claimed in claim 9, wherein the universal optical fiber (100) has the core (102), wherein the core (102) has a first relative refractive index $\Delta_1$, wherein the core (102) has the first radius $r_1$, wherein the first radius $r_1$ is in a range of 4.8 micron to 5.5 micron, wherein the core has a curve parameter $\alpha$ in a range of 2.5 to 7, wherein the universal optical fiber (100) has the buffer clad region (104), wherein the buffer clad region (104) has a second relative refractive index $\Delta_2$, wherein the second relative refractive index $\Delta_2$ of the buffer clad region (104) is in a range of 0 to 0.04, wherein the buffer clad region (104) has the second radius $r_2$, wherein the second radius $r_2$ is in a range of 7.2 micron to 11 micron, wherein the universal optical fiber (100) has the trench region (106), wherein the trench region (106) has a third relative refractive index $\Delta_3$, wherein the third relative refractive index $\Delta_3$ is in a range of −0.25 to −0.30, wherein the trench region (106) has the third radius $r_3$, wherein the third radius $r_3$ is in a range of 15 micron to 20 micron, wherein the universal optical fiber (100) has the cladding (108), wherein the cladding (108) has a fourth relative refractive index $\Delta_4$, wherein the fourth relative refractive index is zero, wherein the cladding (108) has the fourth radius $r_4$, wherein the fourth radius $r_4$ is 62.5 micron.

* * * * *